(No Model.) 3 Sheets—Sheet 1.

H. SCHOENFELD.
CORN PLANTER.

No. 351,405. Patented Oct. 26, 1886.

Witnesses.
W. Rossiter
W. C. McArthur

Inventor:
Henry Schoenfeld
By H. Harrison
Atty.

(No Model.) 3 Sheets—Sheet 2.

H. SCHOENFELD.
CORN PLANTER.

No. 351,405. Patented Oct. 26, 1886.

Witnesses.

Inventor.
Henry Schoenfeld
By H. Harrison
Atty.

(No Model.) 3 Sheets—Sheet 3.
H. SCHOENFELD.
CORN PLANTER.
No. 351,405. Patented Oct. 26, 1886.
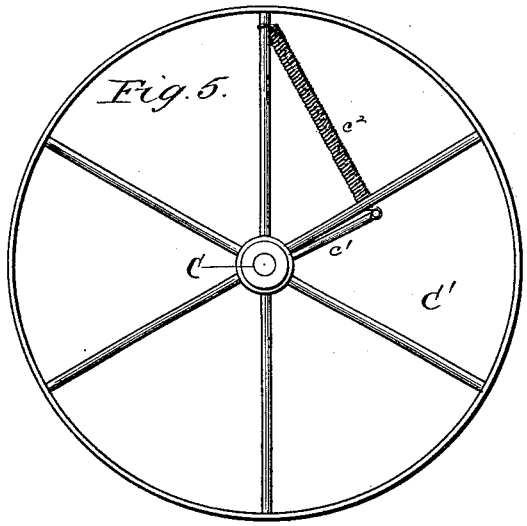
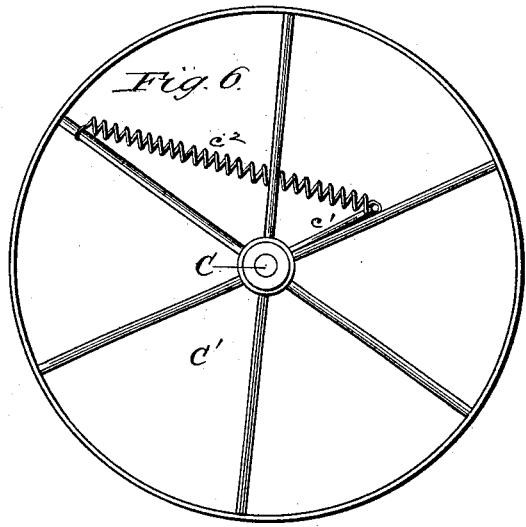
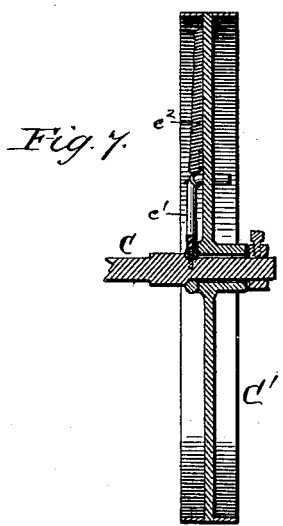
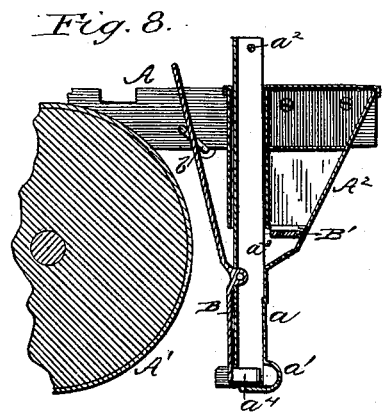
Witnesses.
W. Rossiter
H. C. McArthur
Inventor.
Henry Schoenfeld
By H. Harrison
Atty.

UNITED STATES PATENT OFFICE.

HENRY SCHOENFELD, OF BARABOO, WISCONSIN.

CORN-PLANTER.

SPECIFICATION forming part of Letters Patent No. 351,405, dated October 26, 1886.

Application filed August 11, 1885. Serial No. 174,139. (No model.)

*To all whom it may concern:*

Be it known that I, HENRY SCHOENFELD, a citizen of the United States, residing at Baraboo, in the county of Sauk and State of Wisconsin, have invented certain new and useful Improvements in Corn-Planters, of which the following is a specification, to wit:

This invention relates to corn-planters; and it consists in certain peculiarities of the construction and arrangement of the same, substantially as will be hereinafter more fully described and claimed.

In order to enable others skilled in the art to which my invention appertains to make and use the same, I will now proceed to describe its construction and operation, referring to the accompanying drawings, in which—

Figure 1:
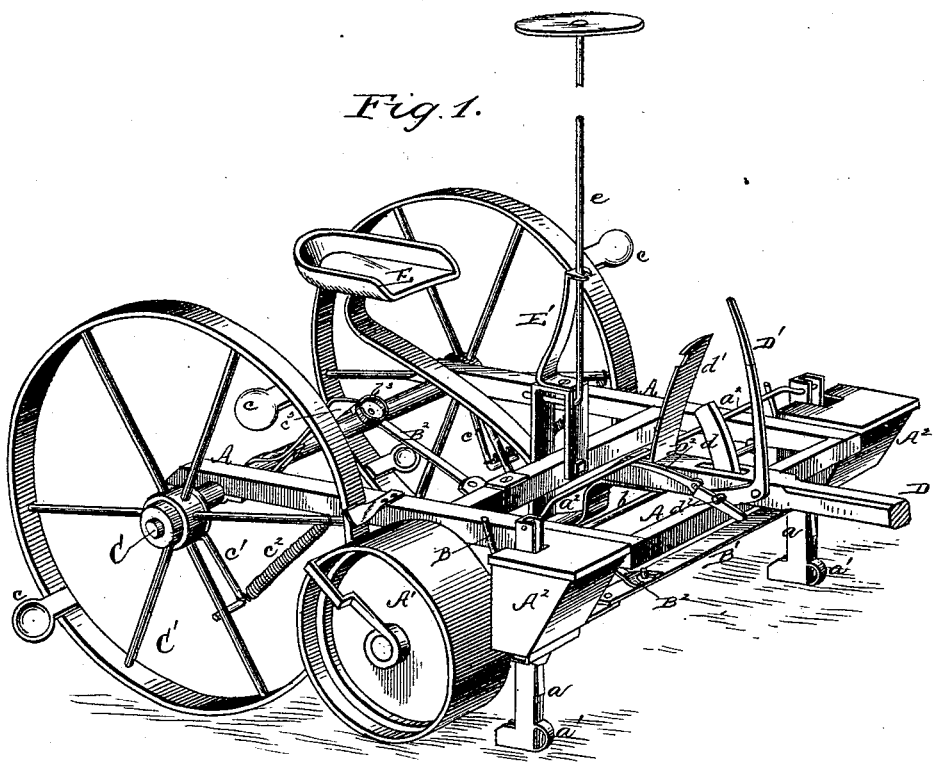
Figure 4:
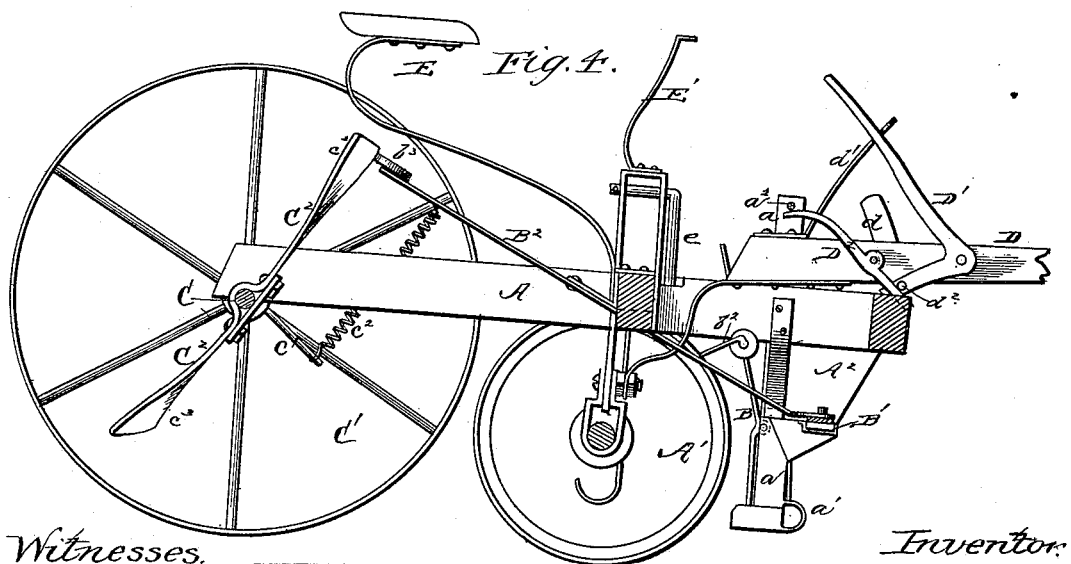
Figure 2:
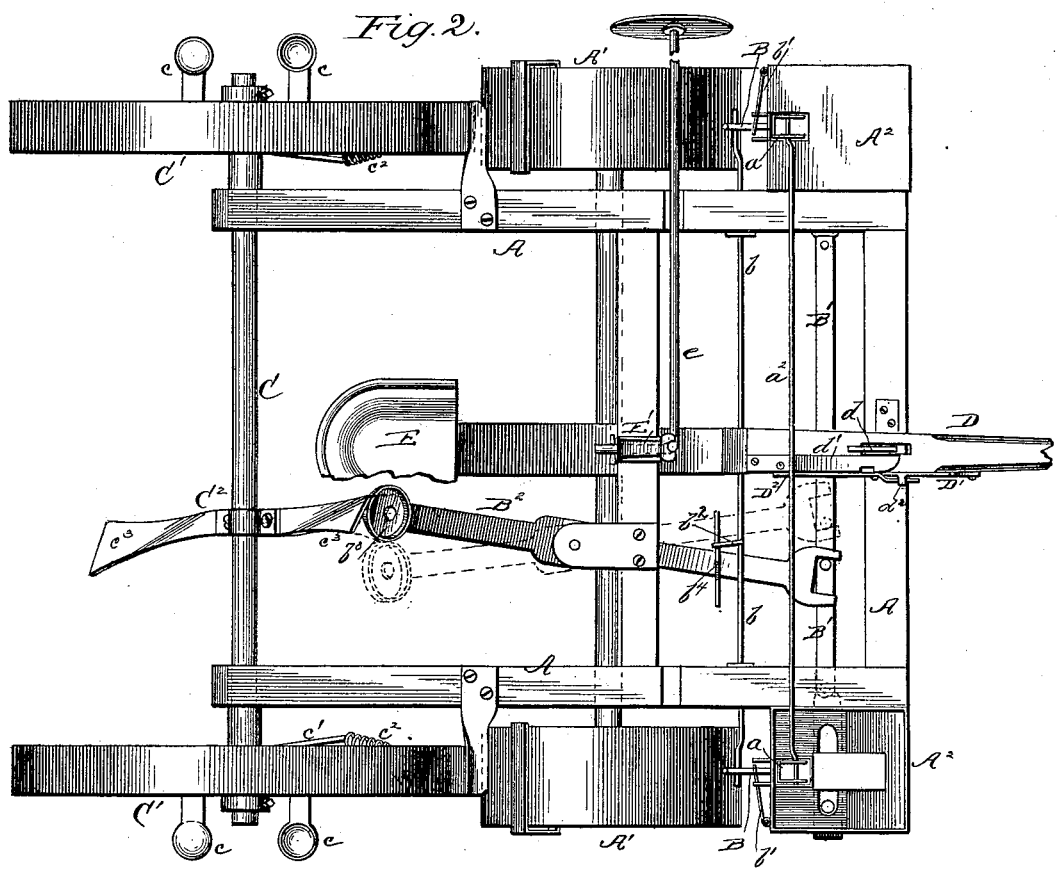
Figure 3:
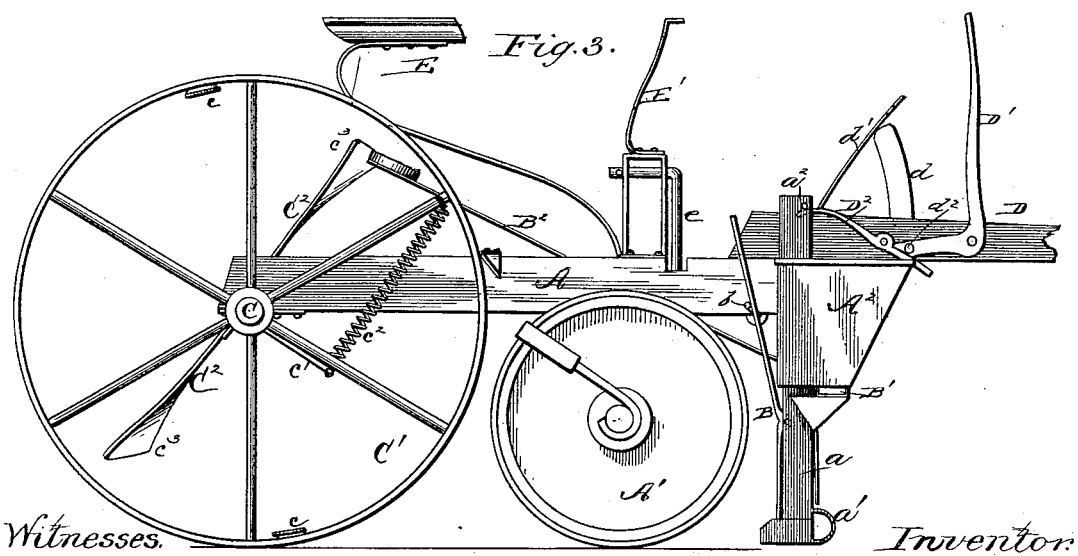

Figure 1 is a perspective view of my invention. Fig. 2 is a plan view of the same; Fig. 3, a side elevation; Fig. 4, a longitudinal section. Figs. 5, 6, and 7 are detail views of the marking-wheels, and Fig. 8 is a section of the seed-box and hollow dropping-shoe.

A represents the main frame of my corn-dropper, which is of any suitable form, of wood or metal, and is mainly supported upon two broad-faced wheels, A', which act as covering-wheels to cover the seed after being dropped by the machine.

Upon the forward end of the main frame are placed the seed-boxes $A^2$, one upon each side of the machine, each of which is provided with a hollow leg, $a$, having a shoe, $a'$, on its lower end to open the ground for the reception of the seed. Each leg $a$ passes entirely through the seed-box, or through a sheath secured to it, and they are connected above the boxes by a cross-bar, $a^2$, the purpose of which will be presently explained. Within the lower end of the box or the guide-sheath the forward side of the leg is cut away, as at $a^3$, to permit the seed to pass down, and in its lower end is a small receiving box or frame, $a^4$, without a bottom, into which the seed falls. This frame is carried by a lever-arm, B, fulcrumed on the rear side of the hollow leg, and the upper arms of both these levers rest against a cranked shaft, $b$, rocking in suitable bearings on the main frame, which, when rocked, moves the levers and draws their lower ends and the seed-receptacles out, to allow their contents to drop out in the furrow made by the shoe as the machine is drawn forward. The levers are thrown back to place by means of springs $b'$, secured to the legs or frame and bearing against them. The rock-shaft $b$ is provided with an arm, $b^2$, which is operated as hereinafter more fully explained.

The seed-slide B' passes across the machine, its ends passing through the lower ends of the seed-boxes $A^2$, and it is operated by means of a lever, $B^2$, fulcrumed on the main frame, its forward end engaged with the seed-slide and its rear end provided with a small friction-wheel, $b^3$, as shown in Fig. 2. The forward arm of this lever also carries a small double incline, $b^4$, which, when the lever is rocked, lifts the arm $b^2$ to operate the rock-shaft $b$ and the seed-dropping levers, as before explained.

The rear end of the main frame carries an axle, C, on each end of which is a wheel, C', provided with projections or arms $c$, to mark the hills. These wheels are loose on the axle; but the latter is caused to move with the former by means of a small arm, $c'$, secured on each end of the axle and engaging one of the spokes of the wheels. These arms are further connected to the wheels by means of the spiral springs $c^2$, which prevent the wheels from turning backward or slipping with the motion of the machine. On the axle C are secured two arms, $C^2$, which have their outer ends inclined in opposite directions, as at $c^3$, and which in their revolutions strike and move the operating-lever $B^2$ from side to side at regular intervals.

The tongue D is hinged to the main frame, and is guided vertically by a stud, $d$, on the frame, and it is provided also with a segment-rack, $d'$, to engage and hold an angular lever, D', fulcrumed on the tongue. The heel of this lever rests on the forward end of the main frame, and when it is drawn back the frame is thereby depressed at its front and lifted at its rear end, to lift the rear wheels off the ground and prevent the movement of the marking-wheels or dropping of the seed while turning at the end of a row or when moving from field to field. The lever D' is provided with a projecting pin, $d^2$, which engages and bears upon a second lever, $D^2$, on the tongue, the rear end of which, when moved, lifts the cross-bar and hollow sliding legs, in order that these latter shall not interfere with the movements of the machine or be accidentally caught and broken when the forward end of the machine is depressed, as just described.

The driver's seat E is provided, as usual, in a convenient position, and within easy reach of this is hinged a long bar or rod, e, on the end of which is a small wheel, which rests on the ground on one side or the other of the machine and marks the place for the next row. When not in use, this bar is lifted to a vertical position and held in the forked end of a spring-arm, E', as in Fig. 1.

In operation the seed is placed in the boxes and the machine is drawn forward, the shoes opening up a furrow to receive the seed, and the broad-faced covering-wheels covering it in at once and forming a smooth track, in which the marking-wheels follow, and which enables them to more accurately measure the ground and their marks to be more easily distinguished. The turning of the rear axle causes one of its arms to strike the operating-lever and throw it and its seed-slide over, this movement of the slide drawing out the required number of grains and allowing them to fall through the hollow leg from each box to the small frames or receptacles below, and as the slide is moved back again the double incline on the operating-lever rocks the cranked shaft and causes the dropping-levers to draw the seed out of the shoe into the furrow, and the springs on these levers at once throw them back again quick enough to receive the next charge of seed as it is dropped by the slide. As each charge is collected and held in the end of the leg within the shoe, it has, when finally dropped, only a slight distance to fall and cannot become scattered, but drops in a bunch in the furrow, and is easily covered by the broad wheel following. The marking-arms are so gaged that they arrive at their lowest point and form a depression in the earth at the exact point at which the charge of seed was planted, and thus no mistake can occur when starting in at the end of a row, and the cross-rows will be straight and even. The connection of the marking-wheels to the rear axle by springs, as in Figs. 5, 6, and 7, allows for any side twist or sliding of the machine without disturbing the proper positions of the markers and incorrectly measuring and marking the hills. At the end of a row the use of the lever D' lifts the rear of the frame and the marking-wheels, as also the legs and their shoes, clear off the ground, and the whole is again dropped after turning, the marks made by the rear wheels being the guides for starting the machine, and the balance of the hills being properly measured and dropped as it proceeds.

The machine plants two rows at once, and the marker is swung from one side to the other by the driver without leaving his seat. The wheels are all provided with scrapers, as usual, to prevent their becoming clogged with dirt when working in moist ground.

Having thus fully described my invention, what I claim as new, and desire to secure by Letters Patent, is—

1. In a corn-planter, the combination, with a revolving axle, of a marking-wheel thereon and a spring-connection between the axle and wheel, whereby the wheel is caused to move with the axle, but is free to have a slight independent movement controlled by said spring, substantially as and for the purpose set forth.

2. In a corn-planter, the combination, with a revolving axle provided with an arm rigidly secured thereto, of a marking-wheel loose upon the axle, engaging said arm, and also connected thereto by a spring, substantially as and for the purpose set forth.

3. In a corn-planter, a main frame carrying the seed-boxes on one end and the marking-wheels on the other, and provided with a vertically-sliding planting leg or shoe, in combination with a lever for depressing the front of the frame to lift the markers, and at the same time lifting the vertically-sliding leg, substantially as and for the purpose set forth.

4. In a corn-planter, the main frame A, provided with the marking-wheels on one end and the seed-boxes at the other, and the vertically-sliding planting legs and shoes $a$ $a'$, in combination with the tongue D, hinged on the frame, and the levers D' D², one of which operates the frame and the other the shoes, substantially as and for the purpose set forth.

5. In a corn-planter, a pair of seed-boxes connected by a slide and a pair of vertically-sliding dropping legs and shoes connected across the machine, and each provided with a seed-receptacle in its lower end carried by a spring-actuated lever, in combination with a slide-operating lever provided with a double incline, and a cranked rock-shaft having an arm resting on said incline and connected to the dropping-levers, whereby the charge is dropped into the shoe, and thence to the ground, substantially as and for the purpose set forth.

In testimony whereof I affix my signature in presence of two witnesses.

HENRY SCHOENFELD.

Witnesses:
E. W. YOUNG,
J. P. WILSON.